United States Patent [19]

Snurr

[11] 3,737,136
[45] June 5, 1973

[54] ADJUSTABLE HEIGHT SUPPORT

[76] Inventor: Gordon R. Snurr, 520 W. 6th Street, Waynesboro, Pa. 17268

[22] Filed: Mar. 29, 1972

[21] Appl. No.: 239,035

[52] U.S. Cl. ............. 248/412, 108/144, 287/58 CT, 297/345
[51] Int. Cl. ............................................. E04g 25/08
[58] Field of Search ..................... 248/410, 411, 412, 248/414, 125, 188.5, 295, 336, 337; 287/58 CT; 108/106, 144; 297/338, 345

[56] References Cited

UNITED STATES PATENTS

| 2,563,040 | 8/1951 | Junkunc | 287/58 CT |
| 2,710,048 | 6/1955 | Dawson | 248/412 |
| 2,742,082 | 4/1956 | Lief | 248/412 |
| 2,961,260 | 11/1960 | Newlin | 287/58 CT |
| 3,480,247 | 11/1969 | Waner | 248/336 |

FOREIGN PATENTS OR APPLICATIONS

| 256,145 | 8/1926 | Great Britain | 248/412 |

*Primary Examiner*—Marion Parson, Jr.
*Attorney*—Brady, O'Boyle & Gates

[57] ABSTRACT

An adjustable height support for furniture and the like features a ball wedge positive lock between the two relatively linearly movable units of the support structure. A retarder or drag device between the relatively movable units is activated in the locking engagement preliminary to the positive engagement of the ball wedge lock. Height adjustment is infinite so as to increments of adjustment and locking is substantially instantaneous.

11 Claims, 6 Drawing Figures

PATENTED JUN 5 1973  3,737,136
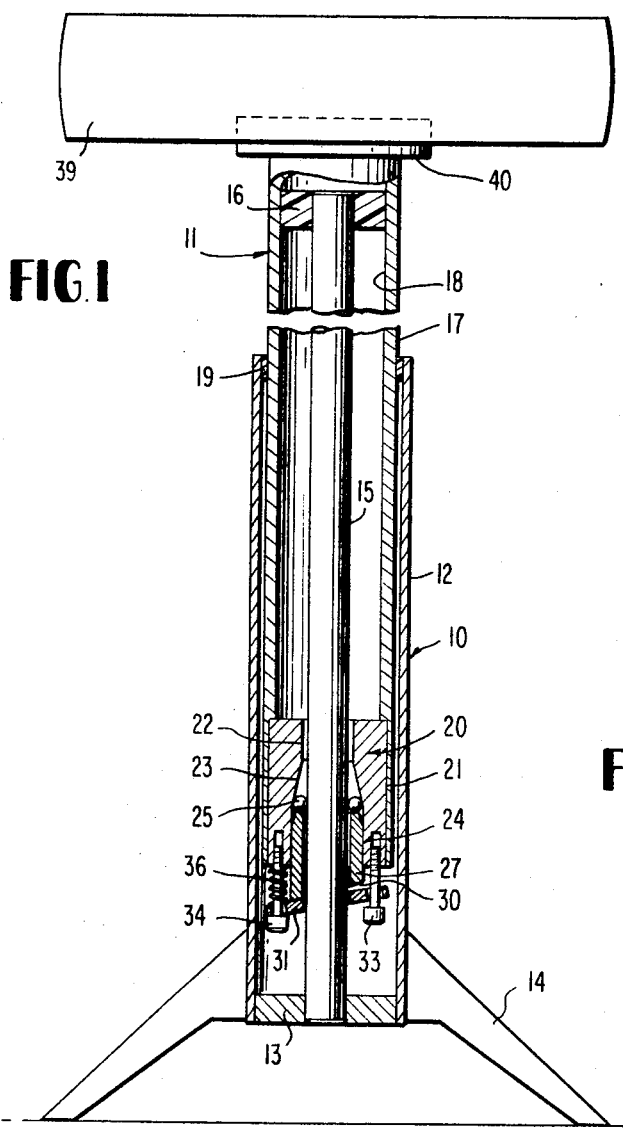
FIG.1
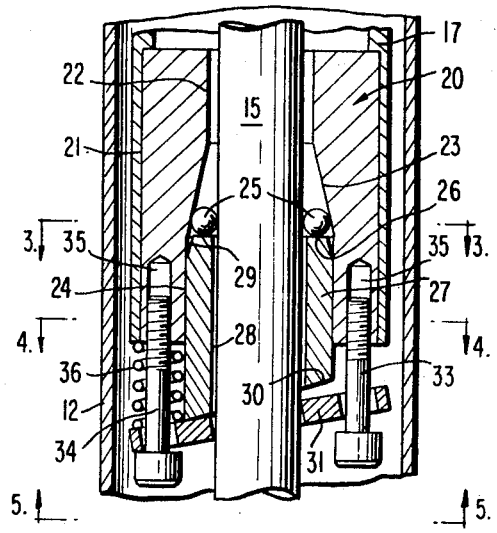
FIG.1A
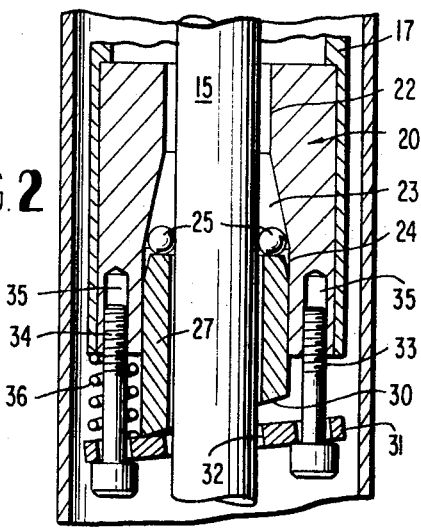
FIG.2
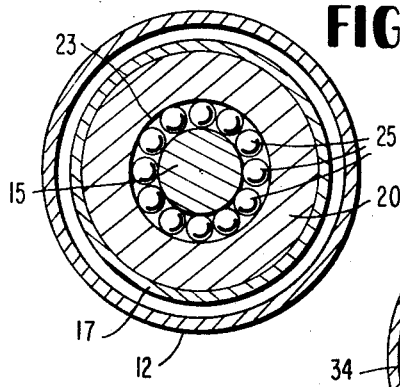
FIG.3
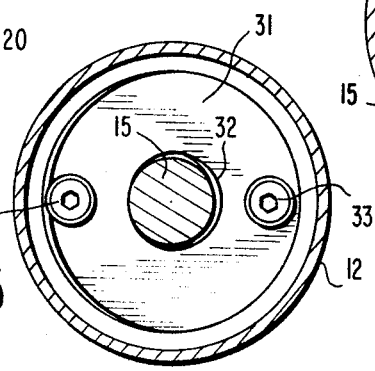
FIG.5
FIG.4

000
ADJUSTABLE HEIGHT SUPPORT

The object of the invention is to provide an improved, simplified, reliable and safe height adjustment mechanism for furniture legs, stool and table pedestals, drafting boards and the like. More particularly, the aim of the invention is to provide an adjustable height support which is operable quickly without the use of handles, levers, screws or other release devices. In accordance with the invention, the user of a stool or the like equipped with the invention may adjust the stool to any desired height and securely lock it in the selected adjusted position by a simple lifting and release operation and without the aid of any separate or attached manual operators.

The invention is characterized by its extreme simplicity of construction and operation, minimum number of parts and the avoidance of the necessity for close manufacturing tolerances of fabricated parts, thus rendering the device economical to manufacture. The safety and reliability of the mechanism allows it to comply with all recent State and Federal industrial safety regulations.

While the invention is applicable to a wide variety of height adjustable structures, it is thought to be particularly suitable for use with stools for technicians, dentists and the like, which must be frequently and quickly adjusted by the technician or dentist without distracting him from his primary work.

Various features and advantages of the invention will become more apparent during the course of the following detailed description.

BRIEF DESCRIPTION OF DRAWING FIGURES

FIG. 1 is a central vertical section through an adjustable height stool embodying the invention with the locking mechanism shown in the active or locking position.

FIG. 1A is an enlarged fragmentary vertical section through the ball wedge locking mechanism of the support in the active position.

FIG. 2 is a similar view showing the mechanism in the inactive or release position to allow raising and lowering of the stool.

FIG. 3 is a horizontal section taken on line 3—3 of FIG. 1A.

FIG. 4 is a similar section taken on line 4—4 of FIG. 1A.

FIG. 5 is a similar section taken on line 5—5 of FIG. 1A.

DETAILED DESCRIPTION

Referring to the drawings in detail wherein like numerals designate like parts, the numerals 10 and 11 designate adjustable telescopic assemblies or main units of an adjustable height stool embodying the invention. It will become apparent that the stool may be raised and lowered and safely locked at any elevation within the available range of adjustment by a mere linear relative movement of the units 10 and 11, initiated by simply relieving the locking mechanism of the weight of the assembly 11, followed by the quick release or dropping of this assembly. The resulting locking action, after height adjustment, is practically instantaneous. It should be pointed out prior to proceeding with the description that while the invention is being described in relation to a stool the structure is equally applicable to furniture legs or pedestals, drafting boards, and a variety of similar structures which require frequent and secure height adjustment.

Continuing to refer to the drawings, the assembly or unit 10 comprises an upright cylindrical tube 12 having a sturdy disc 13 welded securely in its lower end. Any form of stable base 14 is rigidly secured to the lower end portion of the tube 12 to support the same vertically. A central vertical cylindrical post or shaft 15 has its lower end welded within an opening in the disc 13 and extends axially through the tube 12 and above the top end thereof, concentrically therewith. The top end of the shaft 15 carries a preferably plastic cylindrical head or disc 16, rigid therewith, serving as a guide element for the relatively movable unit 11 and also forming an upper and lower limit stop for the extensible unit 11. It may now be seen that the assembly or unit 10 constitutes a base unit for the stool consisting of the above described parts which are in fixed relation.

The relatively movable unit or assembly 11 comprises a cylindrical vertical tube 17 of somewhat smaller outside diameter than the bore of tube 12 and fitting telescopically into the latter. The bore 18 of tube 17 receives the bearing element 16 slidably and a preferably plastic sleeve bearing 19 in the upper end of tube 12 receives the periphery of the tube 17 slidably. Therefore, the interior tube 17 is guided and supported relative to the outer tube 12 at two axially spaced points by the bearings 16 and 19 and this assures smooth axial relative movement between the units 10 and 11 when a height adjustment is being made.

The unit 11 further comprises a relatively heavy sleeve 20 or locking body fixedly secured in a slightly increased diameter lower end bore portion 21 of the tube 17. The body 20 has a relatively short cylindrical bore 22 at its upper end surrounding the shaft 15 in spaced concentric relationship. The bore 22 leads to a central steeply upwardly cylindrically tapered bore portion 23 in the locking body 20, in turn leading downwardly and joining an enlarged cylindrical bore portion 24 which opens through the lower end of the locking body 20.

An annular group of wedge locking steel balls 25 surround the cylindrical steel shaft 15 within the confines of the tapered bore 23 and these balls rest upon the annular upper end face 26 of a ball retainer and actuator sleeve 27. The retainer and actuator sleeve 27 has a center cylindrical bore 28 surrounding the shaft 15 concentrically and spaced slightly therefrom. The top end of the sleeve 27 is externally tapered at 29 to prevent any interference between the sleeve and the conically tapered bore 23. The sleeve 27 has a free sliding fit on the shaft 15 and has its lower end 30 machined on an angle diagonally of the axis of shaft 15 for a reason soon to become apparent. The sleeve 27 also is freely slidable in the cylindrical bore portion 24 of locking body 20.

A drag or retarding ring 31 is disposed below the ball retainer and actuator sleeve 27 and has a central circular opening 32 of somewhat larger diameter than the shaft 15 and loosely receiving the shaft. The opposite ends of the bore or opening 32 form substantially square corners with the opposite faces of the ring 31.

The ring 31 is supported in spaced relation to the bottom of the tube 17 and locking body 20 by a pair of vertically adjustable screws 33 and 34 which project through openings in the drag ring and enter threaded openings 35 in the lower end of the body 20. A light compression spring 36 surrounds the screw 34 with its opposite ends bearing on one side of the ring 31 and the adjacent bottom face of the body 20. By means of the screw 34, the tension of the spring may be adjusted and the height as well as the angularity of the drag ring 30 may also be adjusted by manipulating the screws 33 and 34 to provide a precise operation of the mechanism. It may be seen that the top of the ring 31 contacts only the lowermost point of the sleeve 27, the weight or force transmitted through this freely sliding sleeve tending to cock or cant the drag ring in conjunction with the action of the spring 36.

In order to prevent relative rotation between the sleeve 27 and the locking body 20, a rigid key 37 on the locking body projects into a keyway 38 formed in the exterior of the sleeve 27 and extending longitudinally thereof. The sleeve 27 is freely movable longitudinally and is not restricted in this movement by the key.

While relative rotation between the units 10 and 11 is possible mainly because the balls 25 are not positively wedged into contact with one another but only with the shaft 15 and bore portion 23, this rotation is not relied upon in the case of a stool, and the seat 39 of the stool is preferably interconnected with the top of tube 17 by a low friction bearing 40.

The mode of operation of the adjustable height support is as follows:

When it is desired to raise or lower the seat 39 to any desired level, it is merely necessary for the user to slightly lift the seat and the unit 11 of which the seat is a part. As soon as the weight of the unit 11 is held in the hands of the operator, the locking mechanism will assume the free or unlocked position shown particularly in FIG. 2 of the drawings. At this time, the wedge locking balls 25 have dropped from contact with the tapered bore 23 and there is no longer any lock between the units 10 and 11. Additionally, the canted drag ring 31 under the weight of sleeve 27 and the influence of spring 36 is now released from gripping engagement with the shaft 15 and is resting upon the heads of the two screws 33 and 34 in a release position. The operator can now raise or lower the seat 39 to any elevation limited only by the upper stop element 16 and the full down position of the unit 11.

When the desired height adjustment has been made, the operator merely releases and drops the seat unit 11 and when this is done the mechanism moves substantially instantly to the positive locking position shown in FIGS. 1 and 1A. As the unit 11 is released and dropped for rapid downward movement, the balls 25 and sleeve 27 will tend to drop but the pressure of spring 36 on the drag ring 31 plus the tendency for the massive locking body 20 and tube 17 to move downwardly more rapidly than the sleeve 27 and balls will cause further canting or tilting of the ring 31 which immediately grips the shaft 15 with a dragging or retarding action, FIG. 1A. This drag effect is sufficient to stop the downward movement of the sleeve 27 with the unit 11 and the stopping of the sleeve forces the balls upwardly into wedged locking engagement with the shaft 15 so that no further downward movement of the unit 11 is possible. All of this action occurs almost instantly, as stated, when the unit 11 is dropped, so that the stool may be quickly and conveniently adjusted to any height.

More weight that is applied to the seat 39 after any given adjustment the tighter the wedging locking action becomes and therefore the mechanism is completely safe and always reliable. Due to the steepness of the tapered bore 23, the locking mechanism will always release easily when the weight of the unit 11 is transferred to the hands regardless of the amount of weight and the degree of shocks applied downwardly to the support. The free rolling action of the wedge locking balls also assures unfailing release of the mechanism.

It must be fully understood in connection with the invention that the canted ring 31 serves only as a drag or brake to retard the downward movement of the sleeve 27, preliminary to the wedge locking action of the balls relative to the shaft 15. In no case is the action of the ring 31 relied upon to lock the support or to bear heavy weight, as this would be dangerous. Instead, when weight is applied to the support, this is resisted and supported by the wedged balls and the drag ring serves only to initiate the locking action of the balls in conjunction with the free sliding retainer and actuator sleeve 27.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

I claim:

1. An adjustable height support comprising a supporting base unit including a central upstanding shaft, a second unit connected telescopically to the base unit and adapted to be raised and lowered relative to the base unit by axial movement, a gravity-responsive wedge locking means on the second unit movable therewith and also movable relative thereto, and said wedge locking means including a drag element adapted to grip said shaft and initiate the locking action of the wedge locking means when the second unit is abruptly released to a free falling condition following height adjustment of the support, lifting of the second unit serving automatically to release the wedge locking means and drag element.

2. The structure of claim 1, and the wedge locking means comprising on the second unit a freely axially movable wedge device surrounding said shaft, a cooperating tapered wedge bore on the second unit lockingly engaged by the wedge device when the wedge device moves axially in one direction on the second unit and forcing the wedge device into positive locking engagement with said shaft, said drag element comprising a canted drag ring mounted loosely on said shaft and contacting the lower end of said wedge device, and supporting and adjusting means for said canted drag ring on said second unit and allowing the inclination of the drag ring to be varied and positively limiting downward displacement of the drag ring on the second unit responsive to lifting the second unit.

3. The structure of claim 2, and said supporting and adjusting means comprising a pair of diametrically opposed adjusting screws on the lower end of the second unit having heads supporting opposite sides of the drag ring at different elevations, and a compression spring on one adjusting screw having opposite ends engaging the top of the drag ring and the bottom face of the second unit.

4. The structure of claim 2, and said freely axially movable wedge device comprising an annular array of wedge locking balls in said tapered wedge bore surrounding said shaft, and a ball retainer and actuator sleeve arranged below said balls and tapered bore and surrounding said shaft and supporting said balls and having its lower end contacting the top of the canted drag ring.

5. The structure of claim 4, and said sleeve having a diagonally inclined lower end face and the lowermost part of said end face resting on the lower side of the canted drag ring.

6. The structure of claim 5, and said second unit having a lower end cylindrical bore below the tapered wedge bore receiving said sleeve for guided axial movement therein.

7. The structure of claim 5, and a key means on the second unit engaging said sleeve and resisting rotation thereof relative to the second unit while allowing free relative axial movement of the sleeve.

8. The structure of claim 1, and the second unit including a vertical tube body telescoped over said upstanding shaft of the base unit, and at least one bearing element on the upstanding shaft slidably supporting the bore of the tube body of the second unit.

9. The structure of claim 8, and said bearing element comprising a bearing head secured to the upper end of said shaft.

10. The structure of claim 8, and said wedge locking means bodily carried by the lower end of said tube body in surrounding relationship to said upstanding shaft.

11. The structure of claim 10, and said wedge locking means on the lower end of the tube body comprising a sleeve member having an internal upwardly tapering steep conical bore, said bore surrounding said shaft concentrically, a freely axially movable sleeve surrounding said shaft below said conical bore, an array of wedge locking balls surrounding said shaft and resting on the top of said sleeve and disposed within said conical bore, and an adjustable friction drag element dependingly secured to the bottom of said sleeve member and adapted to engage said shaft grippingly for forming a support for said freely movable sleeve.

* * * * *